United States Patent [19]
Belsdorf et al.

[11] 3,834,247
[45] Sept. 10, 1974

[54] TOOTHED RACK FOR A RACK-AND-PINION STEERING GEAR OF MOTOR VEHICLES

[76] Inventors: Manfred Belsdorf, Meerbusch 1, Poststr. 4a; Klaus Stuck, Meerbusch 2, Thomas-Mann-Str. 23, both of Meerbusch, Germany

[22] Filed: Apr. 17, 1973

[21] Appl. No.: 351,839

[30] Foreign Application Priority Data
May 31, 1972 Germany.............................. 2226443

[52] U.S. Cl.................................... 74/422, 74/439
[51] Int. Cl........................... F16h 1/04, F16h 55/12

[58] Field of Search...................... 74/422, 439, 448

[56] References Cited
UNITED STATES PATENTS
3,059,489 10/1962 Gourley............................ 74/422 X
3,720,115 3/1973 Vertin.............................. 74/422 X

*Primary Examiner*—Leonard H. Gerin
*Attorney, Agent, or Firm*—Ernest F. Marmorek

[57] ABSTRACT

The toothed rack is constructed from a base having a hollow profile into which the toothed segment is fixedly mounted.

8 Claims, 5 Drawing Figures

３,８３４,２４７

TOOTHED RACK FOR A RACK-AND-PINION STEERING GEAR OF MOTOR VEHICLES

FIELD OF THE INVENTION

The present invention relates to a toothed rack for use with a rack-and-pinion gear-type steering for motor vehicles.

BACKGROUND OF THE INVENTION

The above-mentioned toothed racks are usually and exclusively made from a round full rod. For this purpose a portion of the rack is given a toothing, usually by the removal of the excess material. The tooth width or pitch due to the above is substantially smaller than the diameter of the rod originally. From the tooth width or pitch is, however, dependent the skip-prevention which is an essential factor in determining the quality of a steering. In addition, the largest bending momentum is usually acting within the region of the toothing. The latter is usually the case when the cross-tie rods are not coaxial with the toothed rack. In addition it is noted that right at this very sensitive region the bending strength of the toothed rack is reduced due to the toothing.

SUMMARY OF THE INVENTION

It is, therefore, an object of the present invention to provide an improved toothed rack the critical diameter and especially the toothed width or pitch of which is independent from the diameter of the rack and which, in its region not carrying the teeth, can be constructed very lightly and inexpensively.

According to the present invention the toothed rack is provided with a longitudinal recess into which a specially constructed toothed segment is built in.

According to the present invention and, one aspect thereof, the rack itself has a hollow profile, such as a tube.

According to a further aspect of the present invention the outer wall, in the region of the recess, has at least a pair of flat partial surfaces. Such partial flat surfaces serve for the supporting of the toothed rack in one or more pressure members in its assembled condition. The partial surfaces are obtained by deforming the pipe in the region of the recess.

According to a further aspect of the present invention between the toothed rack and the toothed segment there is provided a rubber-elastic lining, for example, by being vulcanized into its place. With the toothed rack according to the present invention a special advantage is obtained in that the tooth carrying width of the segment is independent from the width of the toothed rack itself. For example, according to the present invention, the width of the teeth can be greater than the segment member placed into the recess made in the toothed rack.

BRIEF DESCRIPTION OF THE DRAWING

The invention will become more readily apparent from the following description of preferred embodiments thereof shown in the accompanying drawing, in which.

DESCRIPTION OF THE PREFERRED EMBODIMENTS

Figure 1:
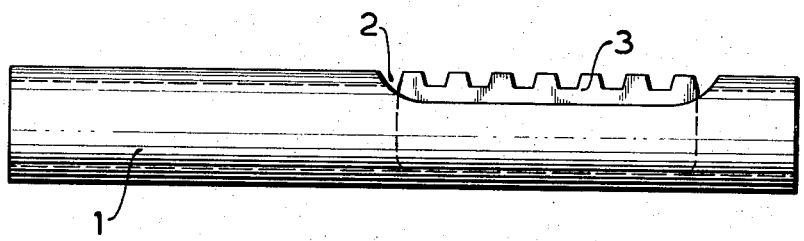
FIG. 1 illustrates a toothed rack consisting of a pipe with a toothed segment inserted thereinto, in side elevation, according to the present invention.

With reference to FIG. 1 it is seen that the rack 1 is constructed from a pipe and into which a recess 2 is made for receiving therein fixedly a toothed segment 3 in a manner that the toothed rack 1 according to the present invention has the same structural qualities and strength as the previously used conventionally machine toothed racks machined from a single round rod as discussed above, and in addition it has the above-mentioned superior properties.

Figure 2:
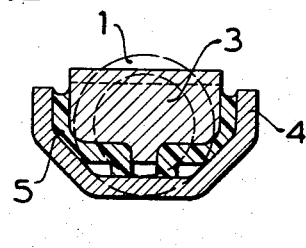
FIG. 2 is a cross-section view of the toothed rack according to FIG. 1, the cross-section being taken in the region of the recess, illustrating the pipe-type toothed rack with the tooth segment placed thereinto.

With reference to FIG. 2 it is seen that the pipe serving as the base unit of the toothed rack is deformed in the region of the recess 2 so that it possesses several partial side surfaces 4 which serve for the engagement by other pressure surfaces or members when the toothed rack is in its final assembly. In addition, between the pipe-shaped rack 1 and the toothed segment 3 which is placed thereinto, there is provided a rubber-like elastic lining 5 which can be vulcanized into its place.

Figure 3:
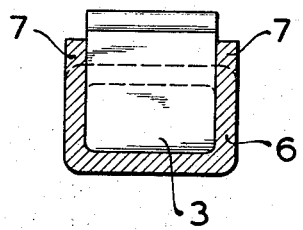
FIG. 3 is a similar view as FIG. 2, however, the toothed rack carrying the segment is a square-shaped pipe.

With reference to FIG. 3 which illustrates a boxlike pipe profile 6 the upper sides 7 of which at the region of the recess 2 are bent out upward in order to form the recess from the otherwise square-shaped pipe. As can be seen with the dashed illustration of the structure of FIG. 3, the remaining portion of the rack 1 retain the square-shaped pipe construction except in the region of the recess 2 where the slit-up upper side of the pipe 6 forms a recess by virtue of the bending out of the upper portion 7 of the pipe 6.

Figure 4:
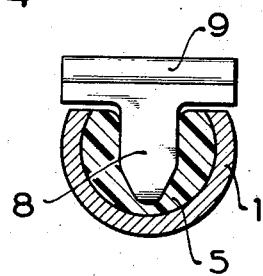
FIG. 4 is a sectional view similar to FIGS. 2 and 3 in which the width of the toothed portion is larger than the width of the segment placed in the recess of the toothed rack.

Another embodiment is illustrated in FIG. 4 in which the rack 1 in its assembled condition has a toothed segment placed into it which has a smaller or narrower foot portion 8 and a wider upper portion 9 in order to provide for a wider tooth width which extends beyond the general outline of the pipe 1. In this manner the skip-safety, that is a uniformity of the steering, is assured. The lining 5 between the rack pipe 1 and the segment 2, more particularly between its foot portion 8 and the pipe 1, has the function of damping the thrusts which can be transmitted to the steering gear from the wheels and eventually be felt on the steering wheel.

An essential aspect of the embodiment of FIG. 4 resides in that there is more freedom available in the designing of the steering arrangement with this embodiment, since the designer of the steering arrangement will not be limited by the otherwise small diameter of a conventional toothed rack for the teeth.

Figure 5:
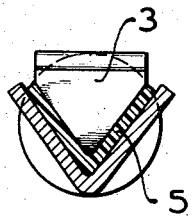
FIG. 5 is another embodiment of the toothed rack according to the present invention which is made from a pipe and which, in the region of the recess has a V-shaped formation.

With reference to FIG. 5 illustrating a further embodiment of the present invention, it can be seen that the rack 1 in the region of the recess 2 is provided with a pipe-profile having a V-shape into which the toothed segment 3 is placed. A lining can be had here also between the toothed segment 3 and the V-profile as illustrated with the insert 5.

I wish it to be understood that I do not desire to be limited to the exact details of the construction shown and described, for obvious modifications will occur to a person skilled in the art.

Having thus described the invention, what I claim as new and desire to be secured by Letters Patent is as follows:

1. A rack-and-pinion steering gear comprising a rack means having a recess formed therein, a toothed segment inserted into said recess for forming a toothed rack for said steering arrangement.

2. The rack-and-pinion gear arrangement as claimed in claim 1, wherein said rack has a pipe-like profile.

3. The rack-and-pinion steering gear as claimed in claim 1, wherein said rack means in the region of said recess has formed thereon at least a pair of partial side surfaces.

4. The rack-and-pinion gear as claimed in claim 1, including an elastic lining inserted between said toothed segment and said rack means.

5. The rack-and-pinion arrangement as claimed in claim 1, wherein the width of the teeth of said toothed segment is wider than the wider width of said rack means.

6. The rack-and-pinion gear arrangement as claimed in claim 1, wherein said rack means is a rectangularly shaped pipe means, said recesses being formed by cutting up the upper portion of said pipe means along the centerline thereof and bending the cut-up portions upwardly to form said recess.

7. The rack-and-pinion gear as claimed in claim 2, wherein said toothed segment has a narrow foot portion and a wide head portion for said teeth.

8. The rack-and-pinion gear as claimed in claim 2, wherein said toothed segment has a V-shaped cross-section, the narrow end of said V-shape being a foot portion and the upper end of said V-shape carrying the teeth, said pipe-profile being formed in the region of said recess to support the sides of said V-shaped toothed segment.

* * * * *